United States Patent [19]

Lim et al.

[11] Patent Number: 4,638,402
[45] Date of Patent: Jan. 20, 1987

[54] MULTI-SECTION CAPACITOR ELECTRICALLY COUPLED IN PARALLEL

[76] Inventors: Basilio Y. Lim, 12931 Sunnyside Pl., Santa Fe Springs, Calif. 90670; Richard N. Marsh, 5424 Sunflower Ct., Livermore, Calif. 94550

[21] Appl. No.: 731,852

[22] Filed: May 7, 1985

[51] Int. Cl.[4] .......................... H01G 4/38; H01G 7/00
[52] U.S. Cl. .................................... 361/328; 29/25.42
[58] Field of Search ................ 29/25.42; 361/328, 330

[56] References Cited

U.S. PATENT DOCUMENTS

| | | | |
|---|---|---|---|
| 1,298,396 | 3/1919 | Pruessman | 361/328 |
| 1,658,501 | 2/1928 | Valle | 361/328 |
| 3,256,472 | 6/1966 | Centurioni | 361/309 |
| 3,921,041 | 11/1975 | Stockman | 29/25.42 X |
| 4,028,595 | 6/1977 | Stockman | 361/328 |
| 4,348,714 | 9/1982 | Wallace | 29/25.42 X |
| 4,352,145 | 9/1982 | Stockman | 29/25.42 X |

FOREIGN PATENT DOCUMENTS 436128  10/1935  United Kingdom ................ 361/330

*Primary Examiner*—Donald A. Griffin
*Attorney, Agent, or Firm*—W. Edward Johansen

[57] ABSTRACT

The present invention is a multi-section capacitor which includes a plurality of capacitor sections. Each of the plurality of capacitor sections has a right end and a left end and is wound from a length of a first metallized dielectric film having disposed on its near surface a first thin metallized layer which extends to its right edge but terminates short of its left edge leaving a non-metallized strip therealong in combination with a length of a second metallized dielectric film having disposed on its near surface a second thin metallized layer which extends to its left edge but terminates short of its right edge leaving a non-metallized strip therealong so that the first and second thin metallized layers are separated by dielectric film. A portion of the first thin metallized layer is removed at a region intermediate the ends of the length for a distance sufficient to encircle the capacitor section at least once. A first electrical contact and a second electrical contact make electrical contacts with the first and second thin metallized layers, respectively, of each of the plurality of capacitor sections. The first and second electrical contacts are disposed adjacent and are mechanically coupled to each of the right and left ends, respectively, of the plurality of capacitor sections.

1 Claim, 8 Drawing Figures

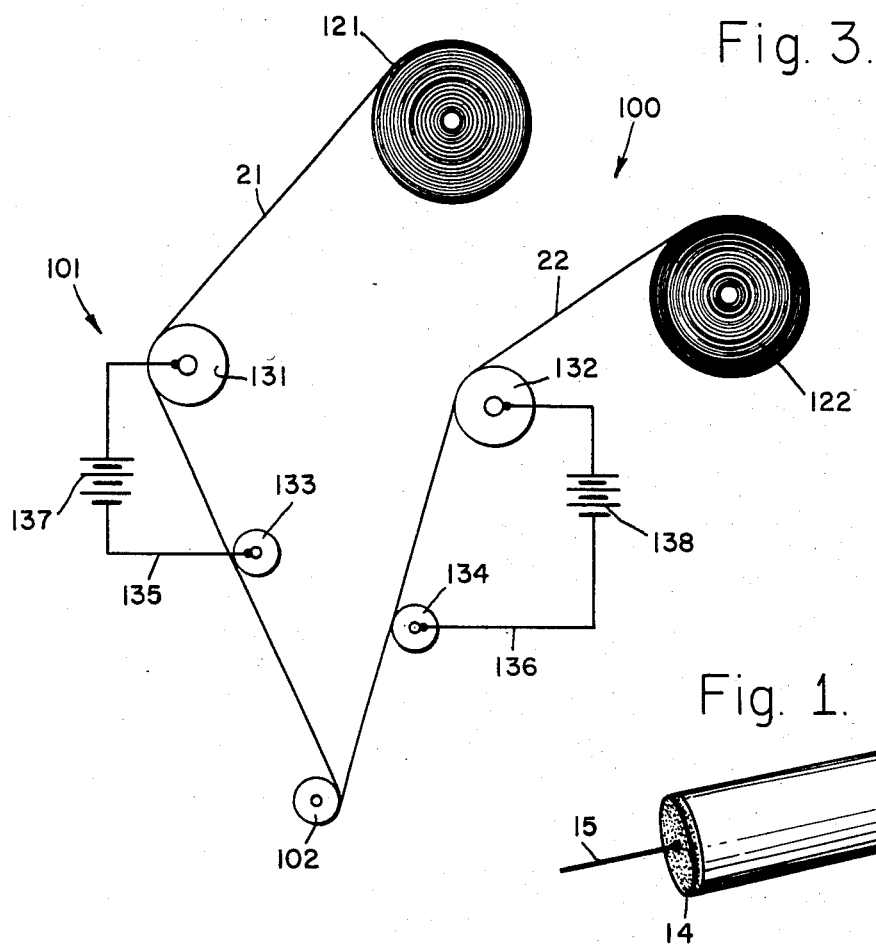
Fig. 3.
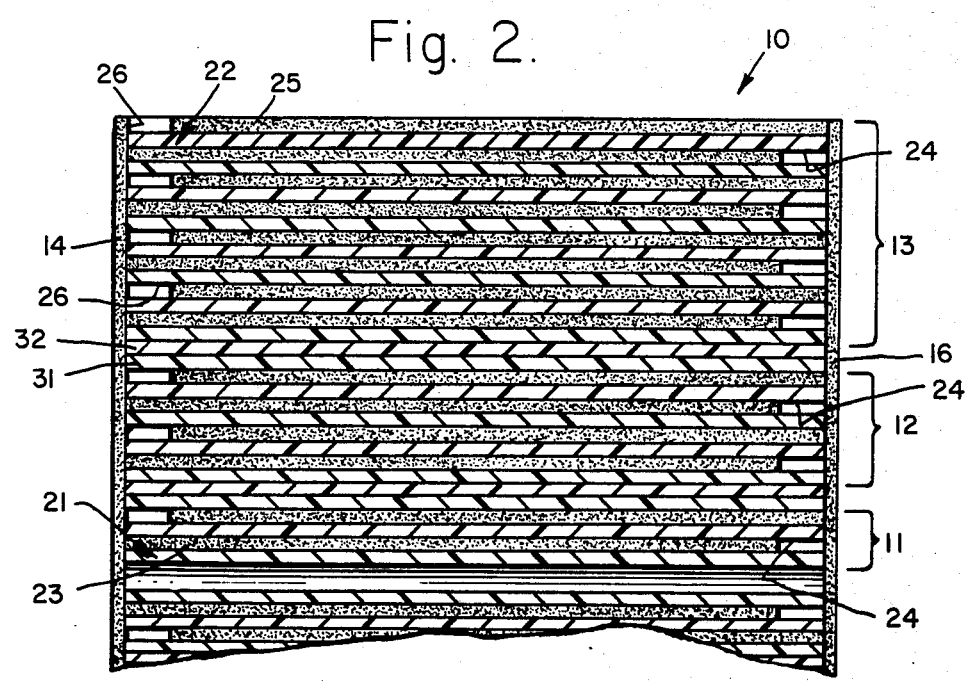
Fig. 1.
Fig. 2.

MULTI-SECTION CAPACITOR ELECTRICALLY COUPLED IN PARALLEL

BACKGROUND OF THE INVENTION

1. Field of the Invention

The present invention relates to a multi-section capacitor having a plurality of capacitor sections each of which is formed out of a pair of metallized dielectric film and more particularly the plurality of capacitor sections are connected in parallel in order to achieve a very high resonating frequency.

2. Description of the Prior Art

U.S. Pat. No. 3,892,023, entitled Process of Manufacturing a Capacitor Assembly, issued to George Warmont on July 1, 1975, teaches a method for making a capacitor assembly which is made up of any number of circular capacitors which are directly interconnected one to another while manufacturing is in progress, and the assembly thereof. A first capacitor is provided with adjacent plates thereof having their edges extending one beyond another. An insulating layer is wound around the first capacitor and a second capacitor is set on the layer. And so on until the wanted number of capacitors is reached. One side of the capacitor assembly, a mask is pushed into a recess provided at the edge of each insulating layer thereof. Both sides of the assembly are then metallized. The masks are removed leaving the required insulation between the various capacitors. The capacitor assembly may contain any number of capacitors, of the same or different capacitive values, in parallel or in series, housed in a single casing.

U.S. Pat. No. 4,028,595, entitled Multi-voltage Capacitor Section, issued to Robert M. Stockman on June 7, 1977, teaches a method for making a multi-voltage capacitor. The method includes the steps of winding a single capacitor section in the usual manner from two metallized films and, after the winding has progressed through the proper number of turns for one of the capacitors, of removing the metallized layer from the surface of at least one film over a selected distance. The method also includes the steps of inserting an insulted sheet having a length sufficient to encircle the capacitor at least once between the film layer in order to extend beyond at least one end of the wound cylinder and of inserting the ends of two additional dielectric strips into the capacitor winding between the metallized films. The method further includes the steps of then completing the winding, of metal-plating each end of the wound section, and of attaching leads to the ends of the capacitor section resulting in a plurality of capacitor having different voltage ratings but wound within a single capacitor section. U.S. Pat. No. 3,921,041, entitled Dual Capacitor, issued to Robert M. Stockman on Nov. 18, 1975, teaches a dual metallized capacitor.

U.S. Pat. No. 4,348,714, entitled Multilayer Tubular Capacitor and Fabrication Thereof, issued to Clarence L. Wallace on Sept. 7, 1982, teaches a roll-up capacitor structure which is embodied by a carrier sheet and electrodes on the sheet. The electrodes have progressively increasing length along the sheet length dimension.

U.S. Pat. No. 4,467,397, entitled Multi-Section Power Capacitor with All-Film Dielectric, issued to Peter H. Thiel, George E. Mercier and Michael D. Pruett on Aug. 21, 1984, teaches an all-film power capacitor in which sections have extended electrode foils and relatively large area edge connections of deposited metal and the space factor of the winding is relatively high.

U.S. Pat. No. 4,307,434, entitled Multi-Section Capacitor Having Continuous Foil Strip Interconnections Between Sections and Method of Making the Same, issued to Barry L. Holtzman on Dec. 22, 1981, teaches wound capacitor sections which have interconnections between their electrodes wherein each interconnection includes a conductive sleeve within a first section in conductive contact with one of its electrodes and a conducive foil tab within another section in conductive contact with one of its electrodes. The tab has an end inserted within the sleeve of the first section.

U.S. Pat. No. 4,423,463, entitled Combined Capacitor and Resistor, issued to Charles M. Serradimigni on Dec. 27, 1983, teaches in a metallized capacitor roll with margin electrodes offset at each roll end, a resistor is place axially in the roll so that one end contacts an electrode across a margin and the other end protrudes from the roll end to be contacted by the schooping metal at the roll end.

SUMMARY OF THE INVENTION

In view of the foregoing factors and conditions which are characteristic of the prior art it is the primary object of the present invention to provide a multi-section capacitor having a plurality of capacitor sections each of which is formed out of a pair of metallized dielectric film wherein the plurality of capacitor sections are connected in parallel in order to achieve very low equivalent series resistance and inductance and very high resonating frequency.

It is another object of the present invention to provide a multi-section capacitor having a plurality of capacitor sections each of which is formed out of a pair of metallized dielectric film wherein some of the plurality of capacitor sections are connected in parallel in order to achieve a very high resonating frequency and the other capacitor sections are connected in series in order to provide a capacitor that has a higher voltage rating, but less capacitance, than does a similarly sized capacitor.

In accordance with the present invention an embodiment of a multi-section capactor is described. The multi-section capacitor includes a plurality of capacitor sections. Each of the plurality of capacitor sections has a right end and a left end and is wound from a length of a first metallized dielectric film having disposed on its near surface a first thin metallized layer which extends to its right edge but terminates short of its left edge leaving a non-metallized strip therealong in combination with a length of a second metallized dielectric film having disposed on its near surface a second thin metallized layer which extends to its left edge but terminates short of its right edge leaving a non-metallized strip therealong so that the first and second thin metallized layers are separated by dieletric film. A portion of the first thin metallized layer is removed at a region intermediate the ends of the length for a distance sufficient to encircle the capacitor section at least once. A first electrical contact and a second electrical contact make electrical contacts with the first and second thin metallized layers, respectively, of each of the plurality of capacitor sections. The first and second electrical contacts are disposed adjacent and are mechanically coupled to each of the right and left ends, respectively, of the plurality of capacitor sections.

The features of the present invention which are believed to be novel are set forth with particularity in the appended claim.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a perspective view of a first multi-section capacitor which includes a plurality of capacitor sections and which has been constructed in accordance with the principles of the present invention.

FIG. 2 is a partial elevational side view in cross-section of the first multi-section capacitor of FIG. 1.

FIG. 3 is a schematic diagram of a winding system for winding a multi-section capacitor which includes a spindle and a pair of supply rolls of metallized dielectric film having a plurality of capacitor sections each of which is mechanically coupled to a burn-off mechanism.

DESCRIPTION OF THE PREFERRED EMBODIMENT

Figure 4:
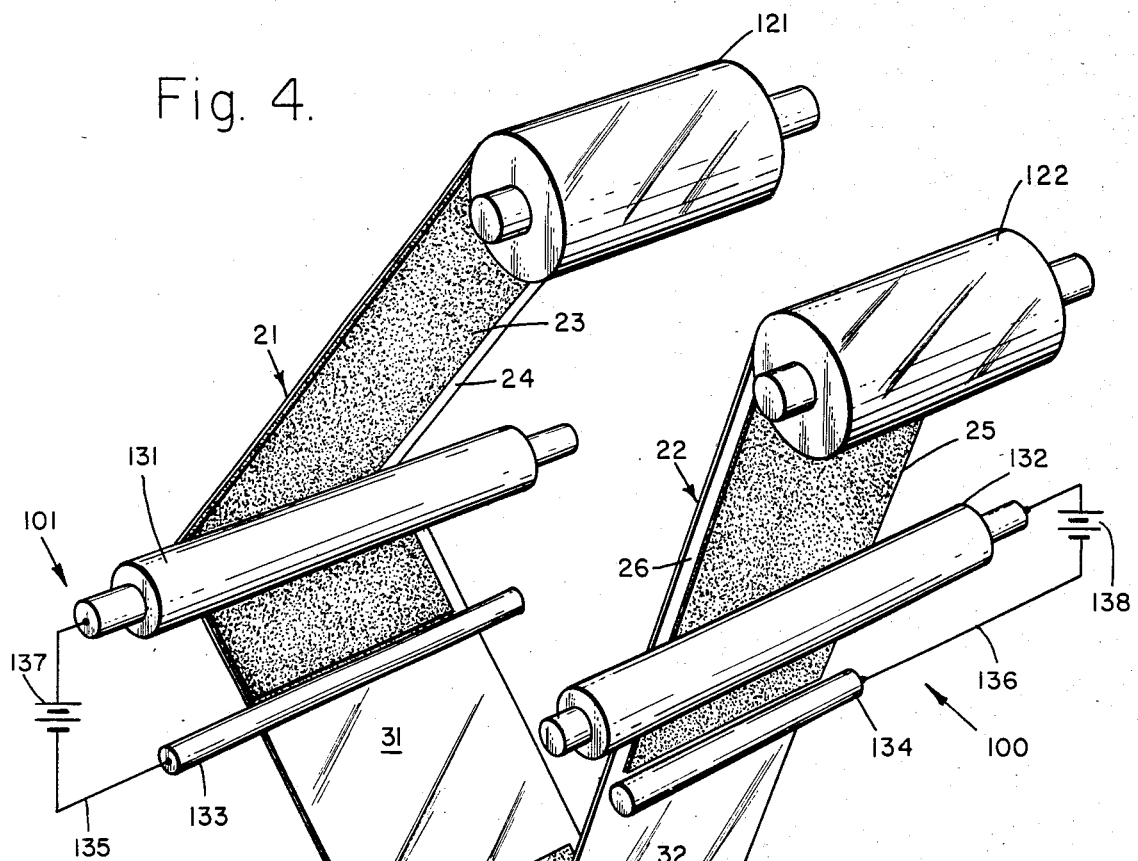
FIG. 4 is a perspective view of a portion of the winding system as it is winding the first multi-section capacitor of FIG. 1.

In order to best understand the present invention it is necessary to refer to the following description of its preferred embodiment in conjunction with the accompanying drawing. Referring to FIG. 1 in conjunction with FIG. 2 a first multi-section capacitor 10 has a first capacitor section 11, a second capacitor 12 and a third capacitor section 13. The first multi-section capacitor 10 also has a first electrical contact 14 which is electrically coupled to a first lead wire 15 and a second electrical contact 16 which is electrically coupled to a second lead wire 17.

Still referring to FIG. 1 in conjunction with FIG. 2 each of the capacitor sections 11, 12 and 13 has a right end and a left end and is wound from a length of a first metallized dielectric film 21 and a second metallized dielectric film 22. The first metallized dielectric film 21 has disposed on its near surface a first thin metallized layer 23 which extends to its right edge but terminates short of its left edge thereby leaving a first non-metallized strip 24 therealong. The second metallized dielectric film 22 has disposed on its near surface a second thin metallized layer 25 which extends to its left edge but terminates short of its right edge thereby leaving a second non-metallized strip 26 therealong. The length of the first and second metallized dielectric films 21 and 22 are wound together in combination so that the first and second thin metalized layers 23 and 25 are separated by dielectric film. A first portion 31 and a second portion 32 of the first and second thin metalized layer 23 and 25 are removed at a region intermediate the ends of the length for a distance sufficient to encircle each of the capacitor sections 11, 12 and 13 at least once. The first and second electrical contacts 14 and 16 make electrical contact with the first and second thin metalized layers 23 and 25, respectively, of each of the capacitor sections 11, 12 and 13. The first and second electrical contacts 14 and 16 are disposed adjacent and are mechanically coupled to each of the right and left ends, respectively, of the capacitor sections 11, 12 and 13.

Referring to FIG. 3 in conjunction with FIG. 4 a conventional winding machine 100 has a burn-off mechanism 101 and a rotating spindle 102 on which the winding machine 100 winds each of the capacitor sections 11, 12 and 13 in conjunction with a first supply roll 121 containing the first metallized dieletric film 21 and a second supply roll 122 containing the second metallized dieletric film 22. The burn-off mechanism 101 may be controlled automatically. The first and second metallized dieletric films 21 and 22 pass over a first copper cylindrical electrode 131 and a second cylindrical electrode 132, respectively, and then over a first movable electrode 133 and a second movable electrode 134, respectively, which are mounted on a first moveable arm 135 and a second movable arm 136 in such a manner as to be selectively advanced against and withdrawn from the first and second metallized layers 23 and 25 of the first and second metallized dieletric film 21 and 22, respectively. A first battery 137 and a second battery 138 are electrically coupled to the first and second copper cylindrical electrodes 131 and 132, respectively, and the first and second movable electrodes 133 and 134, respectively, so that the first and second movable electrodes 133 and 134 are able to burn-off the first and second portions 31 and 32 of the first and second metallized layers 23 and 25.

Figure 5:
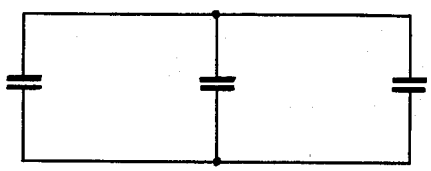
FIG. 5 is a circuit diagram of the first multi-section capacitor of FIG. 1.

Referring to FIG. 1 in conjunction with FIG. 2 and FIG. 5 the electrical equivalent circuit 150 of the first multi-section capacitor 10 is three capacitors connected in parallel. In this first embodiment the first capacitor section 11 has the lowest capacitance and is disposed at the center of the first multi-section capacitor 10; the second capacitor section 12 has a capacitance higher than that of the capacitance of first capacitor section 11 and is coaxially disposed between the first capacitor section 11 and the third capacitor section 13; and the third capacitor section 13 has a capacitance higher than that of the capacitance of the second capacitor section 12 and is coaxially disposed around both the first capacitor section 11 and the second capacitor section 12. By placing the first capacitor section 11, which has the lowest capacitance, in the center both the inductance is lowered and the resonance frequency is raised.

Figure 6:
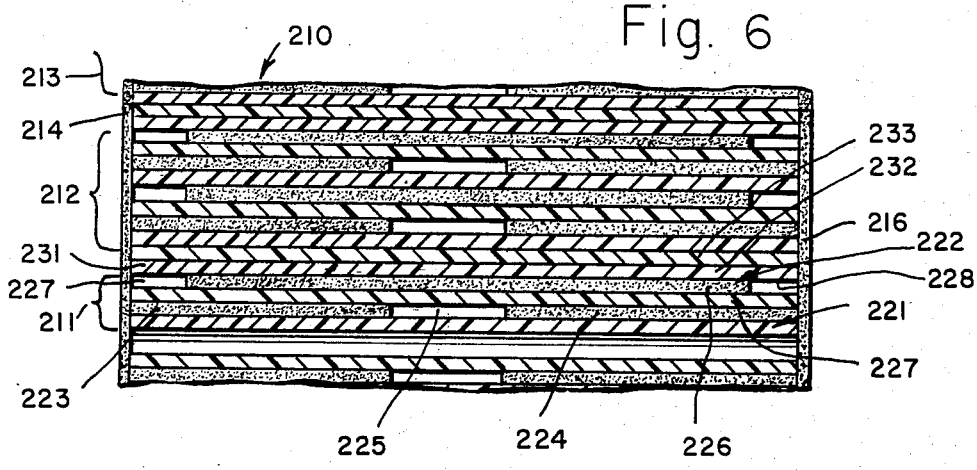
FIG. 6 is a partial elevational side view in cross-section of a second multi-section capacitor which includes a plurality of capacitor sections and which has been constructed in accordance with the principles of the present invention.

Referring to FIG. 6 a second multi-section capacitor 200 has a first capacitor section 211, a second capacitor 212 and a third capacitor section 213. The second multi-section capacitor 210 also has a first electrical contact 214 which is electrically coupled to a first lead wire and a second electrical contact 216 which is electrically coupled to a second lead wire.

Still referring to FIG. 6 each of the capacitor sections 211, 212 and 213 has a right end and a left end and and is wound from a length of a first metallized dielectric film 221 and a second metallized dielectric film 222. The first metallized dielectric film 221 has disposed on its near surface a first thin metallized layer 223 which extends to its left edge but terminates short of its center and a second thin metallized layer 224 which extends to its right edge but also terminates short of its center thereby leaving a non-metallized strip 225 therealong. The second metallized dielectric film 222 has disposed on its near surface a third thin metallized layer 226 which terminates short of both its left edge and its right edge thereby leaving a first non-metallized strip 227 along the left edge and a second non-metallized edge 228 along the right edge so that the first, second and third thin metallized layers 223, 224 and 226 are separated by dieletric film. The lengths of the first and second metallized dielectric films 221 and 222 are wound together in combination so that the first, second and third thin metalized layers 223, 224 and 226 are separated by dieletric film. A first portion 231 of the first thin metalized layer 223, a second portion 232 of the second thin metalized layer 224, a third porion 233 of the third thin metallized layer 226 are removed at a region intermediate the ends of the length for a distance sufficient to encircle each of the capacitor sections 211, 212 and 213 at least once. The first and second electrical contacts 214 and 216 make electrical contact with the first and second thin metalized layers 223 and 224, respectively, of each of the capacitor sections 211, 212 and 213. The first and second electrical contacts 214 and 216 are disposed adjacent and are mechanically coupled to each of the right and left ends, respectively, of the capacitor sections 211, 212 and 213.

Figure 7:
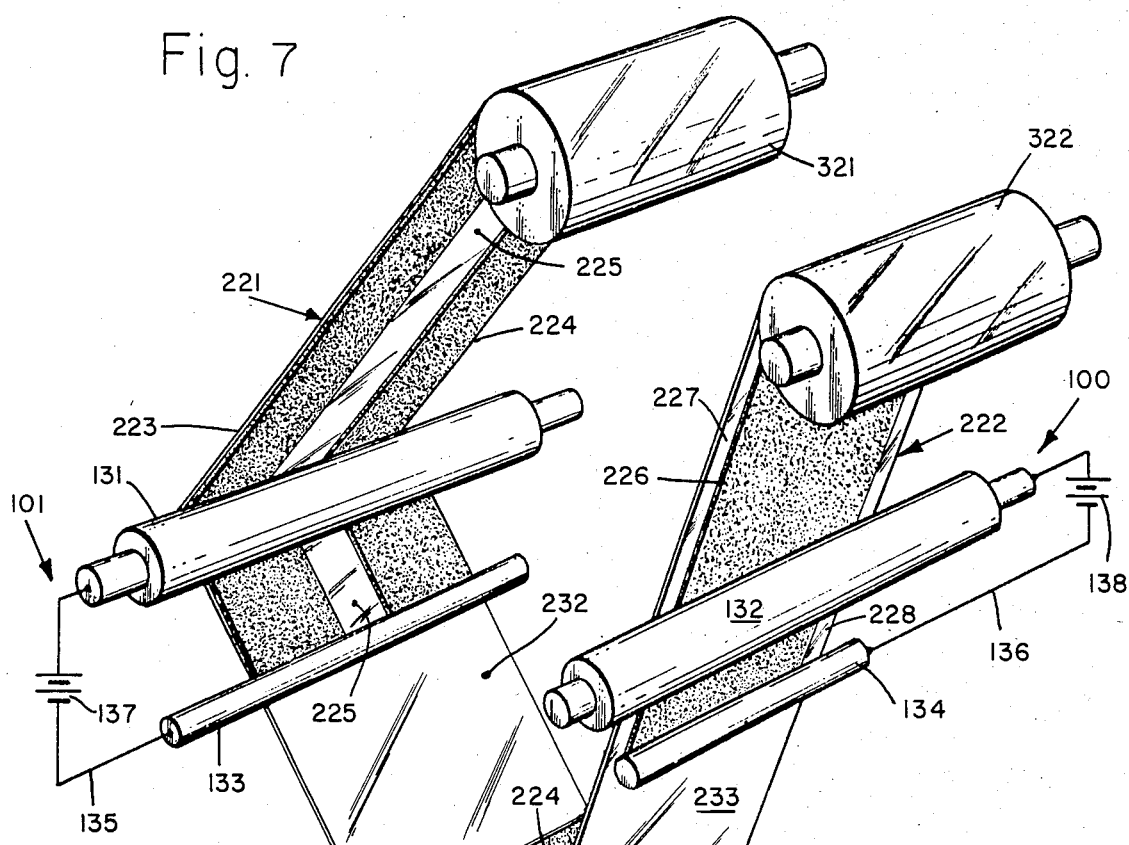
FIG. 7 is a perspective view of a portion of the winding system as it is winding the second multi-section capacitor of FIG. 6.

Referring to FIG. 3 in conjunction with FIG. 7 the conventional winding machine 100 has a burn-off mechanism 101 and a rotating spindle 102 on which the winding machine 100 winds each of the capacitor sections 211, 212 and 213 in conjunction with a first supply roll 321 containing the first metallized dieletric film 221 and a second supply roll 322 containing the second metallized dieletric film 222. The burn-off mechanism 101 may be controlled automatically. The first and second metallized dieletric films 221 and 222 pass over a first copper cylindrical electrode 131 and a second cylindrical electrode 132, respectively, and then over a first movable electrode 133 and a second movable electrode 134, respectively, which are mounted on a first moveable arm 135 and a second movable arm 136 in such a manner as to be selectively advanced against and withdrawn from the first and second metallized layers 223 and 224 of the first metallized dieletric film 221 and the third metallized layer 226 of the second metallized dieletric film 222. Metallized layer 223 of the first metallized dieletric film 221 the first, respectively. A first battery 137 and a second battery 138 are electrically coupled to the first and second copper cylindrical electrodes 131 and 132, respectively, and the first and second movable electrodes 133 and 134, respectively, so that the first and second movable electrodes 133 and 134 are able to burn-off the first portion 231 of the first metallized layer 221, the second portion 232 of the first metallized layer 224 and the third portion 233 of third metallized layer 226.

Figure 8:
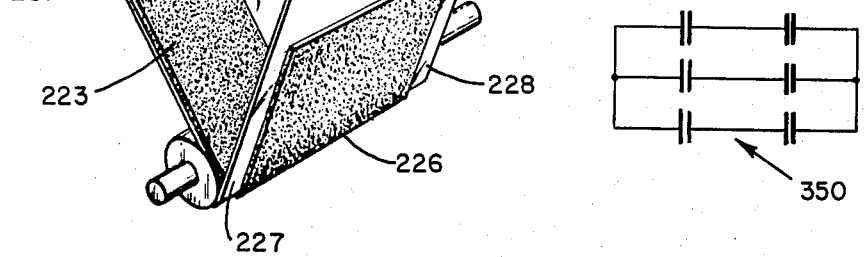
FIG. 8 is a circuit diagram of the second multi-section capacitor of FIG. 1.

Referring to FIG. 6 in conjunction with FIG. 8 the electrical equivalent circuit 350 of the second multi-section capacitor 10 is three sets of two capacitors, each set of which has capacitors connected in series and the set being connected in parallel. In this second embodiment the first capacitor section 211 has the lowest capacitance and is disposed at the center of the second multi-section capacitor 210; the second capacitor section 212 has a capacitance higher than that of the capacitance of first capacitor section 211 and is coaxially disposed between the first capacitor section 211 and the third capacitor section 213; and the third capacitor section 213 has a capacitance higher than that of the capacitance of the second capacitor section 212 and is coaxially disposed around both the first capacitor section 211 and the second capacitor section 212. By placing the first capacitor section 211, which has the lowest capacitance, in the center both the inductance is lowered and the resonance frequency is raised.

From the foregoing it can be seen that a multi-section capacitors which has capacitor sections which are electrically coupled in parallel has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A multi-section capacitor comprising:

a. a plurality of capacitor sections with each of said plurality of capacitor sections having a right end and a left end and being wound from a length of a first metallized dielectric film having disposed on its near surface a first thin metallized layer which terminates short of both its left edge and its right edge leaving a first non-metallized strip along said left edge and a second non-metalized edge along said right edge in combination with a length of a second metallized dielectric film having disposed on its near surface a second thin metallized layer which extends to its left edge but terminates short of its center and a third thin metallized layer which extends to its right edge but also terminates short of its center leaving a non-metallized strip therealong so that said first, second and third thin metalized layers are separated by dieletric film wherein a portion of said first thin metalize layer is removed at a region intermediate the ends of said length for a distance sufficient to encircle said capacitor section at least once;

b. first electrically contacting means for making an electrical contact with said second thin metalized layer of each of said plurality of capacitor sections with said first electrically contacting means being disposed adjacent and mechanically coupled to each of said left ends of said plurality of capacitor sections; and c. second electrically contacting means for making an electrical contact with said third thin metaled layer of each of said plurality of capacitor sections with said second electrically contacting means being disposed adjacent and mechanically coupled to each of said right ends of said plurality of capacitor sections.

* * * * *